June 30, 1936.                M. SPITZ                2,046,041
COMPOSITE CUTTING AND THREADING TOOL
Filed Dec. 29, 1933
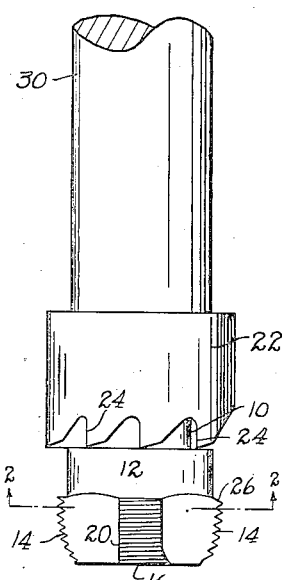
Fig.1
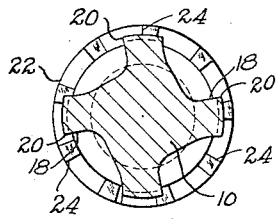
Fig.2
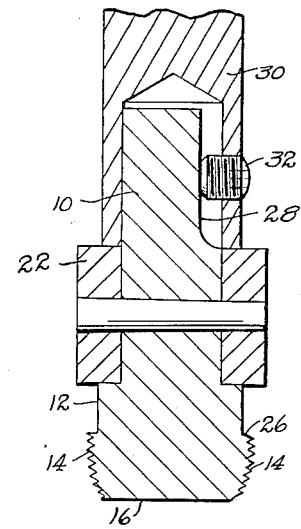
Fig.3
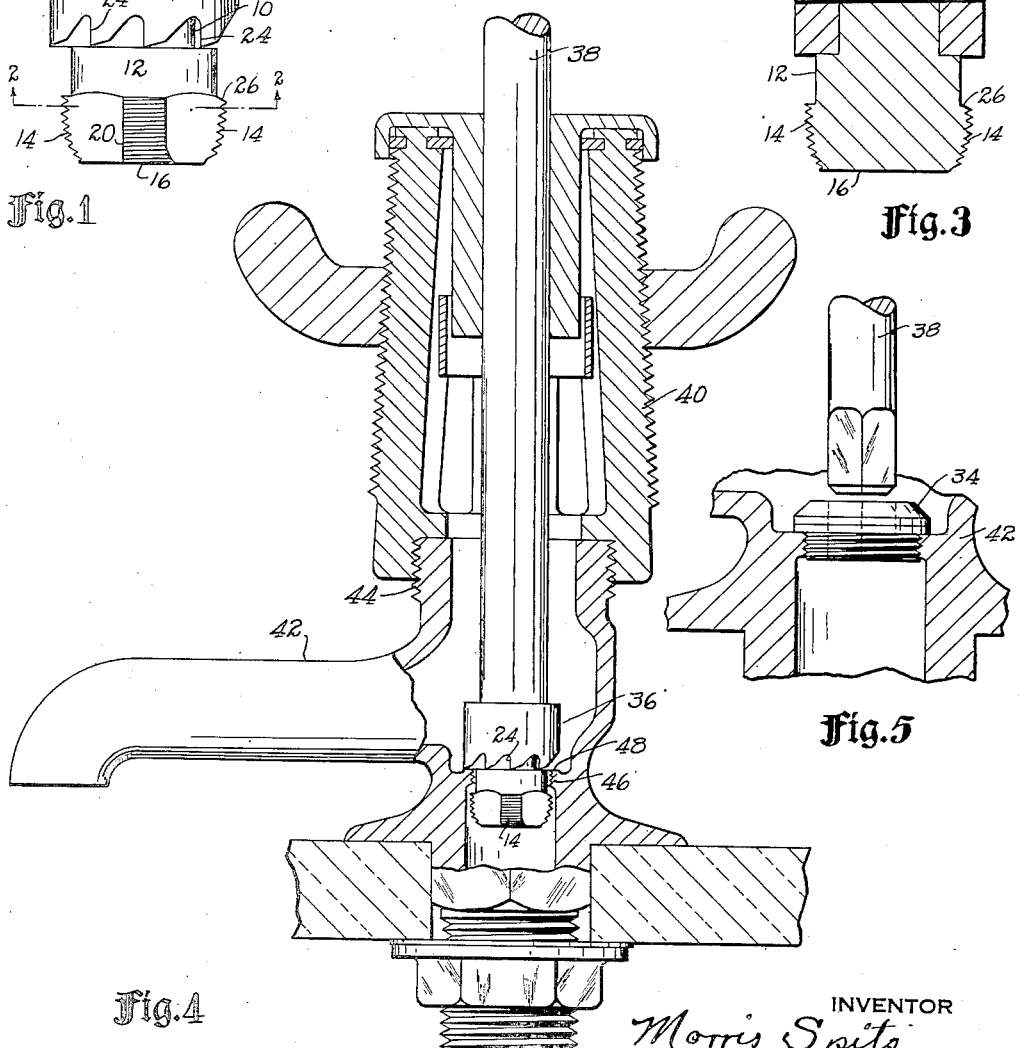
Fig.4
Fig.5
INVENTOR
Morris Spitz
BY
Justin W. Macklin
ATTORNEY Patented June 30, 1936

2,046,041

UNITED STATES PATENT OFFICE 2,046,041

COMPOSITE CUTTING AND THREADING TOOL

Morris Spitz, Cleveland Heights, Ohio

Application December 29, 1933, Serial No. 704,496

3 Claims. (Cl. 10—140)

This invention relates to a composite cutting and threading tool having reaming edges, thread cutting portions, and facing cutters cooperatively arranged to ream or clean out a rough or undersize hole, cut threads therein and face the adjacent surface therearound in a single continuous operation.

It is a general object of this invention to provide a simple tool of this character with which holes or apertures may be reamed and threaded, and upon completion of the threading operation the thread cutting portions of the tool are disengaged from contact with the walls of the hole or aperture and facing cutters thereupon engage and face off the surface adjacent the hole.

It is another object of this invention to provide a multiple tool in which combined reaming, threading, and facing operations may be conveniently and readily accomplished with a continuous movement of the tool, and without requiring adjustments, changes, or any such other disconcerting interruptions in the operation.

It is another object to provide a multiple tool of this character in which the cutting parts are always in alignment, thereby ensuring true machining and obviating the necessity of separately aligning each cutting part.

It is a further object to provide a composite multiple tool of this character which can be easily manufactured at a low cost, and which is adapted for use in many types of machine tool holders with which such is ordinarily used.

Other and more specific objects of this invention will be apparent as it is more fully described in connection with the attached drawing, in which Fig. 1 is an elevation of one form of my invention.

Fig. 2 is an end plan view of the form shown in Fig. 1, along the line 2—2.

Fig. 3 is an elevation in cross section of the same form shown connected to a holding device.

Fig. 4 illustrates one use to which my invention may be put, in connection with reaming, threading and facing of the seat of the spigot.

Fig. 5 is a fragmentary sectional view of the spigot shown in Fig. 4 with a reseating bushing inserted.

Referring now to the drawing, the form of my invention there shown comprises a shank 10 having an enlarged head portion 12 at one end thereof, from which rises thread cutting projections 14. The thread cutting projections rise outwardly or radially from a smaller diameter at one end 16 and extend longitudinally of the head 12 to a greater diameter for a distance less than the length thereof. One edge or face 18 of each of the thread cutting projections 14 is preferably slightly concave, and is preferably machine ground to form a reaming or cutting edge 20. Concentric with respect to the shank 10 is shown a collar member 22 having a plurality of facing cutters 24 formed in one end thereof. This collar member 22 is preferably disposed so that the distance between its cutting edges 24 and the adjacentmost thread cutting portion 26 is equal to or greater than the length of the thread cutting projections 14. It will also be seen in Fig. 4, that the facing cutters 24 are spaced from the adjacent end of the thread cutting projections 14 a distance greater than the thickness of the wall surrounding the aperture 46. The object of this will be more apparent later.

The shank 10 may be suitably notched, as shown at 28, so that when inserted in a suitable holder, such as is shown at 30, it may be securely held therein as by a set screw 32, or any of the other well known means.

In Fig. 4 is shown one use to which my invention may be put. As there illustrated the invention is used to ream, thread and face the worn seat of a spigot for the insertion therein of a suitable reseating bushing member 34, as is indicated in Fig. 5. As illustrated in Fig. 4, the form of my invention there shown, which is designated in its entirety at 36, is securely held in a turning member 38 positioned in a holding device 40, which is more fully described and claimed in my copending application, Ser. No. 635,573, filed September 30, 1932, and which is shown as being screwed onto the spigot 42 at 44. To accomplish the reaming, threading, and facing of the spigot seat for the insertion therein of a seat forming bushing, as shown in Fig. 5, the tool 36 is let down into the spigot until the thread cutting projections 14 engage the unthreaded edges of the aperture 46, and upon turning or rotating the member 38 the reaming edges 20 will clean out or cut away the walls of this aperture and simultaneously therewith the thread cutting projections 14 will form threads therein. As the tool continues to operate the reaming and thread cutting will be completed in a relatively short time and the thread cutters will pass out of engagement with the walls of the aperture 46, whereupon the facing cutters 24 engage the adjacent surface 48 around the aperture 46 and face off the same for any desired amount. It is to be particularly noted that the reaming and threading operation is accomplished before the facing operation commences, and this is made possible by the cooperative relation of the arrangement of parts, whereby a zone of non-engagement, or an idling space, is provided between the thread cutting projections and the facing cutters, as heretofore referred to. This space also acts as a guide for aligning the tool prior to and during the facing operation therewith, its diameter being substantially that of the threads cut in the hole or of the root diameter of the thread cutting portion. This space is preferably made of a length equal to or greater than the axial length of the thread-cutting projections, the latter being usually equal to the depth of the hole to be reamed and threaded.

It will be obvious from the foregoing description that my invention may be employed for many types of operations similar to that just described, for example, it is particularly adapted for reaming and threading holes in relatively thin-walled sections and, in the same operation, for facing the surface therearound. It is to be noted that all of this is accomplished without the necessity of withdrawing the tool from the hole or aperture in which it is originally inserted, or without the necessity of discontinuing the rotation of the tool. It will be obvious that such operations are performed with a considerable saving in time, and the work may be accomplished without the usual disconcerting interruptions which necessarily follow where individual and separate tools are used for each operation.

I have also found that if the number of facing cutters 24 are greater than the number of thread-cutting projections a smoother facing of the surface adjacent the hole or aperture results. I have found that the number of facing cutters should be appreciably in excess of the number of thread-cutting projections.

It will be apparent that many modifications and adaptations of my invention may be made within the scope of the appended claims, and that it may be put to many more uses than I have indicated.

I claim:

1. A threading and facing tool adapted to be employed on a faucet having a hollow body, a wall extending across said hollow body and dividing it into separate chambers, said wall having an aperture therethrough, the threading and facing tool being adapted to cut a thread in the wall surrounding the aperture and to face the surface of the wall surrounding the aperture, the tool comprising a thread cutting portion positioned on the forward end thereof, and a facing portion positioned coaxially of the thread cutting portion and having cutting edges extending substantially perpendicular to the axis, the cutting edges on the facing portion being spaced from the adjacent portion of the thread cutting portion a distance at least as great as the thickness of the wall surrounding the aperture.

2. A threading and facing tool adapted to be employed on a faucet having a hollow body, a wall extending across said hollow body and dividing it into separate chambers, said wall having an aperture therethrough, the threading and facing tool being adapted to cut a thread in the wall surrounding the aperture and to face the surface of the wall surrounding the aperture, the tool comprising a thread cutting portion positioned on the forward end thereof, a facing portion positioned co-axially of the thread cutting portion and having cutting edges extending substantially perpendicular to the axis, the cutting edges on the facing portion being spaced from the adjacent portion of the thread cutting portion a distance at least as great as the thickness of the wall surrounding the aperture, and a guide portion positioned intermediate the thread cutting portion and the facing portion, the guide portion being of substantially the same diameter as the root diameter of the thread cutting portion.

3. A threading and facing tool adapted to be employed upon valve seats having a wall surrounding the valve opening, the tool comprising a thread cutting portion on the forward end thereof, a facing portion co-axially positioned and rigid with and spaced longitudinally from the thread cutting portion and having cutting edges extending substantially perpendicularly to the axis, the spacing between the thread cutting portion and the facing edges being a distance greater than the pitch distance of a given plurality of threads and being greater than the thickness of the wall portion.

MORRIS SPITZ.